UNITED STATES PATENT OFFICE 2,683,666

OPALESCENT IVORY-COLORED GLASS

James Earle Duncan, Brackenridge, and Samuel L. Seymour, New Kensington, Pa., assignors to Pittsburgh Plate Glass Company No Drawing. Application September 26, 1951, Serial No. 248,444

4 Claims. (Cl. 106—52)

This invention relates to opalescent glasses and it has particular relation to novel compositions yielding such glasses in a special ivory or light yellow color.

Opalescent glasses have found rather wide spread adoption as a structural medium, particularly in the construction of store fronts, kitchens, bathrooms, and the like. Their solid, permanent colors, smooth surfaces and wearing qualities have enhanced their value in this field. Production of these glasses in a wide range of colors has been fairly well standardized and even today when material shortages have necessitated variations in batch compositions most of the colors can be obtained. Difficulty has been experienced, however, in compounding a glass having an ivory color which will be satisfactory to the trade. Many attempts have been made to produce an opalescent glass with a color comparable to that imparted by the combination of uranium and selenium oxides, materials not now available for this purpose, without success.

An object of our invention is to provide an ivory colored opalescent glass in which only relatively readily available materials are included.

Another object of the invention is the provision of an ivory colored opalescent glass having definite radiant energy reflectance values.

Other objects and advantages of our invention will become apparent from the following detailed description of certain preferred embodiments thereof.

We have found it to be possible to obtain an ivory or light yellow opalescent glass having definite radiant energy reflectance values by utilizing as color imparting ingredients from 4 to 10 per cent by weight of titanium dioxide and from 0.75 to 2.25 per cent by weight of cerium oxide, with a further inclusion of from 4 to 7 per cent by weight of fluorine for color control.

Typical glass batches embodying the principles of our invention are given in the following table, in which the components are given as parts by weight:

Table I

| Constituent | I | II | III |
|---|---|---|---|
| Sand | 918 | 918 | 818 |
| Soda Ash | 327 | 327 | 235 |
| Nepheline Syenite | 271 | 271 | 253 |
| Fluorspar | 11 | 11 | 11 |
| Sodium Nitrate | 30 | 30 | 30 |
| Sodium Silicofluoride | 132 | 132 | 195 |
| Arsenic Trioxide | 10 | 10 | 10 |
| Titanium Dioxide | 68 | 85 | 150 |
| Cerium Hydrate | 20 | 25 | 44 |

These batches, when melted, result in glasses possessing the desired ivory color. The calculated compositions in per cent by weight are given in Table II:

Table II

| Constituent | I | II | III |
|---|---|---|---|
| $SiO_2$ | 68.43 | 67.53 | 62.86 |
| $Na_2O$ | 16.54 | 16.33 | 14.46 |
| $K_2O$ | 0.83 | 0.82 | 0.78 |
| $CaO$ | 0.44 | 0.48 | 0.44 |
| $Al_2O_3$ | 3.91 | 3.86 | 3.65 |
| $TiO_2$ | 4.14 | 5.11 | 9.13 |
| $F_2$ | 4.16 | 4.11 | 6.0 |
| $As_2O_3$ | 0.61 | 0.60 | 0.61 |
| $CeO_2$ | 0.94 | 1.16 | 2.07 |

It is not necessary that the glass compositions be restricted to the specific examples set forth on the preceding page. For the purposes of the invention, the $SiO_2$ content of the glass may vary from 60 to 70 per cent by weight, the $CaO$ content from 0.1 to 5 per cent by weight, the $Al_2O_3$ content from 0 to 10 per cent by weight and the combined alkali oxides from 15 to 20 per cent by weight without deleterious effect upon the quality of the resultant glass either in structure or color.

Titanium dioxide, cerium oxide and fluorine are necessary to attain the desired ivory color in the glass and the ranges set forth on the preceding page should be adhered to rather closely in order to achieve this result. For example, titanium dioxide and fluorine when used in combination yield a white glass and a balance with cerium oxide is required to produce the ivory shade.

A glass having the composition of that expressed in column II of Table II was tested for radiant energy reflectance values with the following results, relative to pure magnesium oxide and calculated for Illuminant "C," I. C. I.:

*Visible*

| Wave length $m\mu$: | Per cent reflectance |
|---|---|
| 400 | 40.2 |
| 420 | 49.2 |
| 440 | 57.0 |
| 460 | 64.3 |
| 480 | 70.2 |
| 500 | 74.5 |
| 520 | 77.3 |
| 540 | 79.8 |
| 560 | 81.2 |
| 580 | 79.1 |
| 600 | 80.9 |
| 620 | 81.6 |
| 640 | 81.8 |
| 660 | 81.8 |
| 680 | 81.8 |
| 700 | 82.1 |
| 720 | 82.3 |
| 740 | 81.1 |
| 750 | 81.4 |

Other glasses whose compositions fall within the ranges set forth hereinbefore will have comparable radiant energy reflectance values which can be expressed as lying between 25 and 45 per cent at 400 m$\mu$, 50 to 64 per cent at 450 m$\mu$, 66 to 76 per cent at 500 m$\mu$, and from 72 to 82 per cent over the remainder of the visual range up to and including 750 m$\mu$ wavelengths.

What we claim is:

1. An opalescent ivory colored glass consisting essentially of from 60 to 70 per cent by weight of $SiO_2$, from 15 to 20 per cent by weight of combined alkali oxides selected from the group consisting of $Na_2O$ and $K_2O$, from 0.1 to 5 per cent by weight of CaO, from 0 to 10 per cent by weight of $Al_2O_3$, from 4 to 10 per cent by weight of $TiO_2$, from 0.75 to 2.25 per cent by weight of $CeO_2$ and from 4 to 7 per cent by weight of $F_2$.

2. An opalescent ivory colored glass having the composition—

| Component: | Per cent by weight |
|---|---|
| $SiO_2$ | 67.53 |
| $Na_2O$ | 16.33 |
| $K_2O$ | 0.82 |
| CaO | 0.48 |
| $Al_2O_3$ | 3.86 |
| $TiO_2$ | 5.11 |
| $F_2$ | 4.11 |
| $As_2O_5$ | 0.60 |
| $CeO_2$ | 1.16 |

3. An opalescent ivory colored glass as defined in claim 1, said glass having radiant energy reflectance values, relative to pure magnesium oxide and calculated for Illuminant "C," I. C. I., of from 25 to 45 per cent at 400 millimicrons wavelength, 50 to 64 per cent at 450 millimicrons, 66 to 76 per cent at 500 millimicrons, and from 72 to 82 per cent at 550, 600, 650, 700 and 750 millimicrons.

4. An opalescent glass as defined in claim 2, said glass having radiant energy reflectance values relative to pure magnesium oxide, and calculated for Illuminant "C," I. C. I., of 40.2 per cent at 400 millimicrons, 57.0 per cent at 440 millimicrons, 74.5 per cent at 500 millimicrons, 81.2 per cent at 560 millimicrons, 80.9 per cent at 600 millimicrons, 82.1 per cent at 200 millimicrons and 81.4 per cent at 750 millimicrons.

References Cited in the file of this patent

UNITED STATES PATENTS

| Number | Name | Date |
|---|---|---|
| 2,444,976 | Brown | July 13, 1947 |